(12) United States Patent
Tsukamoto et al.

(10) Patent No.: US 6,617,544 B1
(45) Date of Patent: Sep. 9, 2003

(54) CONTROL APPARATUS FOR A THREE-DIMENSIONAL LASER WORKING MACHINE AND THREE-DIMENSIONAL LASER WORKING MACHINE

(75) Inventors: Masuki Tsukamoto, Tokyo (JP); Tomonori Mukae, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/088,955
(22) PCT Filed: May 19, 2000
(86) PCT No.: PCT/JP00/03215
§ 371 (c)(1), (2), (4) Date: Mar. 22, 2002
(87) PCT Pub. No.: WO01/87532
PCT Pub. Date: Nov. 22, 2001

(51) Int. Cl.⁷ ............................................. B23K 26/02
(52) U.S. Cl. ............................................. 219/121.79
(58) Field of Search ....................... 219/121.79, 121.81, 219/158, 162, 121.62, 121.63, 121.64, 121.65, 121.66, 121.67, 121.68, 121.69, 121.7, 121.71, 121.72, 121.78; 700/166, 159

(56) References Cited

FOREIGN PATENT DOCUMENTS

| EP | Hei 1-162592 A | 6/1989 |
| EP | Hei 4-232512 A | 8/1992 |
| EP | Hei 4-344885 A | 12/1992 |
| EP | Hei 7-75982 A | 3/1995 |
| EP | Hei 9-204213 A | 8/1997 |
| EP | Hei 10-211594 A | 8/1998 |
| JP | Hei 5-148615 | 6/1993 |
| JP | 6-182626 | 7/1994 |
| JP | Hei 8-300171 A | 11/1996 |
| JP | 8-300227 | 11/1996 |
| JP | 9-102037 | 7/1997 |
| JP | Hei 9-192937 | 7/1997 |
| JP | Hei 10-130318 | 5/1998 |

OTHER PUBLICATIONS

Hiroyuki et al. Nov. 1996. Translation to JP 08300171 A. pp 1–8.*

"Formation of Hard Layer on Metallic Material EDM", A. Goto et al, VDI Berichte 1405 pp. 270–279 (1998).

* cited by examiner

Primary Examiner—Tom Dunn
Assistant Examiner—Jonathan Johnson
(74) Attorney, Agent, or Firm—Sughrue Mion, PLLC

(57) ABSTRACT

The control apparatus for a three dimensional laser working machine teaches a tip position and an attitude of a nozzle and carries out working based on the teaching in a three-dimensional laser working machine having a head structure that a working point does not change when a rotational axis and an attitude axis are rotated. A nozzle direction vector is calculated from current angles of a rotational axis (14) and an attitude axis (16). An angle that the attitude axis (16) changes for constant time is calculated. An angle through which the rotational axis (14) is to be rotated is calculated so that X and Y directions of the nozzle direction vector are kept constant according to an angle change amount of the attitude axis (16), and the rotation of the rotational axis (14) is controlled by the calculated angle.

7 Claims, 8 Drawing Sheets

PROGRAM COORDINATE

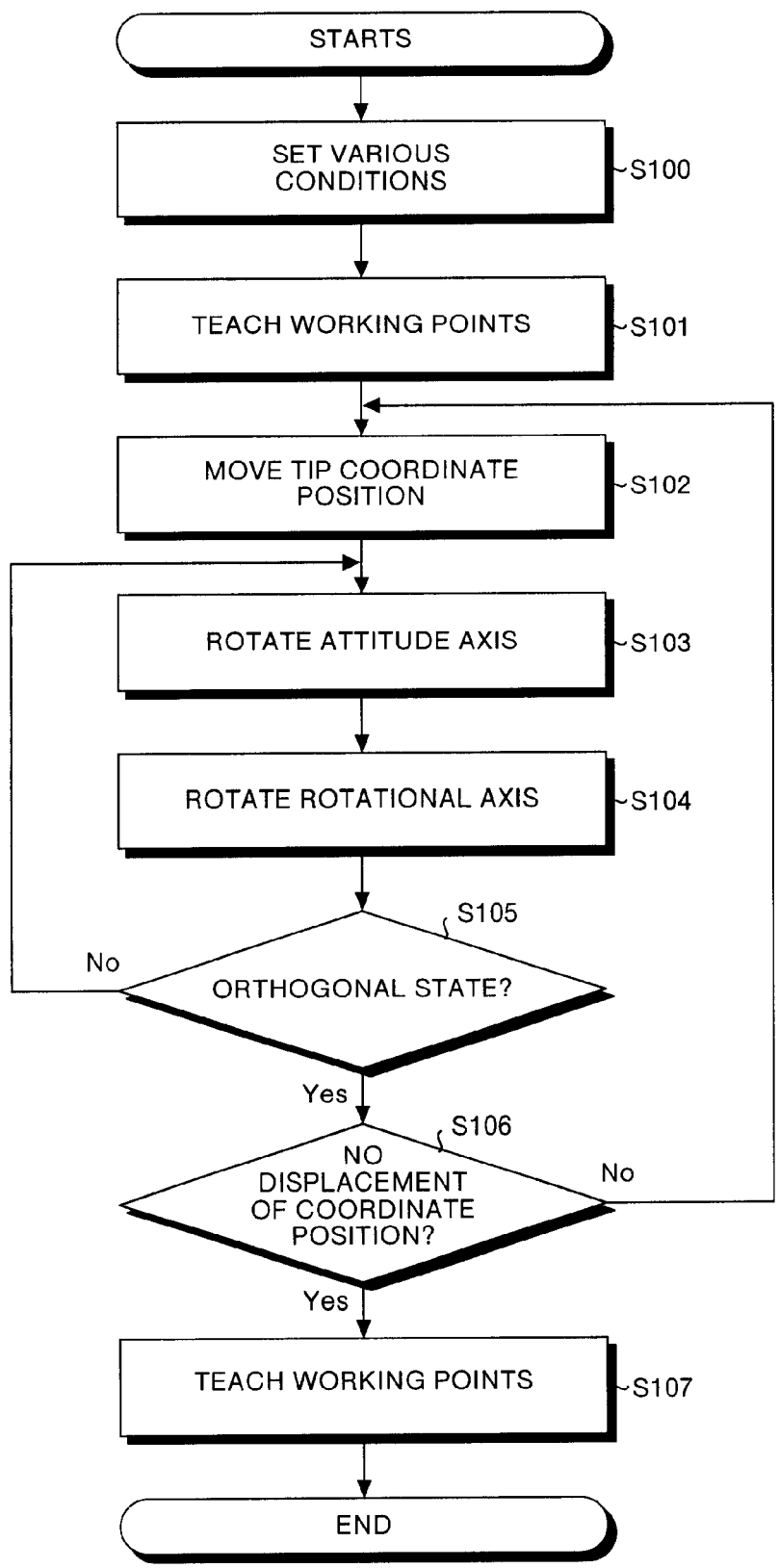

CONTROL APPARATUS FOR A THREE-DIMENSIONAL LASER WORKING MACHINE AND THREE-DIMENSIONAL LASER WORKING MACHINE

TECHNICAL FIELD

The present invention relates to a control apparatus for a three-dimensional laser working machine. More specifically, this invention relates to a control apparatus for a three-dimensional laser working machine having a head structure that a working point does not change when a rotational axis and an attitude axis are rotated, and having a unit which teaches a tip position and a directional attitude of a nozzle.

BACKGROUND ART

As a three-dimensional laser working machine for working a sculptured surface, a three-dimensional laser working machine, which has a rotational axis ($\alpha$ axis) rotatable around a center axis of a Z axis (vertical axis) and an attitude axis ($\beta$ axis) rotatable around an axis slanted with respect to the Z axis and has a head structure that when the rotational axis and the attitude axis are rotated, a working point does not change, is known (see Japanese Patent Application Laid-Open No. 1-162592 (1989)).

FIG. 6 schematically shows the working head having the rotational axis ($\alpha$ axis) and the attitude axis ($\beta$ axis) In FIG. 6, the working head is shown by a reference numeral 50, and the working head 50 has a rotational axis 52, which is rotatable around a center axis of a Z axis by a bearing member 51, at the tip of a Z axis member 60, and an attitude axis 54, which is attached to the tip of the rotational axis 52 by a bearing member 53 and is rotatable around an axis slanted with respect to the Z axis, and a laser nozzle 61 is attached to the tip of the attitude axis 54. The working point is shown by a reference symbol N.

In the three-dimensional laser working of a sculptured surface, in order to maintain an optical axis of a laser emitted to a working surface in a normal direction with respect to the working surface, the laser nozzle is required to be always in an attitude which is orthogonal to the working surface, and teaching which fulfills this requirement is made prior to actual working.

There will be explained below an attitude change of the working head at the time of teaching an attitude change corner section with reference to FIG. 7. In FIG. 7, $P_1$, $P_2$ and $P_3$ show teaching points of a workpiece W. The teaching point $P_1$ is a teaching point on a horizontal surface, the teaching point $P_2$ is a teaching point on a 45 degrees slanted surface of the workpiece W, and the teaching point $P_3$ is a teaching point on an upright surface of the workpiece W. The laser nozzle 61 faces just downward at the teaching point $P_1$, and is slanted 45 degrees at the teaching point $P_2$, and faces the horizontal direction at the teaching point $P_3$.

In order to bring the workpiece W into a state orthogonal to the teaching points $P_1$, $P_2$ and $P_3$, it is necessary to change rotating angles of the rotational axis 52 and the attitude axis 54. For this reason, conventionally in the teaching operation on the attitude change corner section, an operator rotates the rotational axis 52 and the attitude axis 54 every time of the teaching, and brings the laser nozzle 61 into the orthogonal state with respect to the working surface and makes the teaching.

There will be explained below a procedure of the conventional teaching operation of the attitude change corner section with reference to FIG. 8. Firstly, various setting of a teaching box is carried out, and the teaching operation for teaching working points is brought into a startable state by using a working machine (step S100).

Next, an instruction such as shutter opening of an auxiliary function code which is the initial setting in the working program is given, and the working axis is moved to a teaching point by pushing down a working axis feed key which is positioned in the teaching box or by using a handle or a joy stick and the teaching is made so that respective teaching points of the working program are created (step S101). When the teaching points are created, in the conventional teaching operation on the attitude change corner section, for example in the case of the teaching from the teaching point $P_1$ on the horizontal surface to the teaching point $P_2$ on the 45 degrees slanted surface, the working head 50 is moved so that a tip coordinate meets the teaching point $P_2$ on the 45 degrees slanted surface (step S102).

Next, the attitude axis 52 and the rotational axis 54 are moved independently by an operator so that the orthogonal state can be obtained (steps S103 and S104), and this operation is repeated until the orthogonal state is obtained (step S105).

After the orthogonal state is obtained, the tip coordinate is checked for displacement (step S106).

When displacement occurs, the sequence returns to the step S102 so that the tip coordinate is moved. After the tip coordinate is moved, in order to obtain the orthogonal state again, the attitude axis 52 and the rotational axis 54 are rotated. Namely, the steps S102 through S106 are repeated. Similarly, at the time of teaching from the teaching point $P_2$ on the 45 degrees slanted surface to the teaching point $P_3$ on the upright surface, the steps S102 through S106 are repeated.

When the program creation by the teaching operation of the attitude change corner section is completed, thereafter the working axis is moved to a teaching point by pushing down the Working axis feed key of the teaching box, or using the handle or the joy stick and the teaching is made so that the respective teaching points of the working program are created (step S107). However, if the teaching operation of the attitude change corner section is to be performed, then the steps S102 through S106 are executed. Finally, instructions such as shutter closing and program end of the auxiliary function code are given so that the creation of the working program is ended.

In the teaching point check operation, if the attitude angles (=the rotating angles of the rotational axis 52 and the attitude axis 54) are to be changed, it is necessary to readjust the attitude angles at the teaching points, and the attitude angles are corrected according to the above procedure.

As mentioned above, in the working head of the three-dimensional laser working machine having the head structure that the working points do not change when the rotational axis and the attitude axis are rotated, when the attitude axis is rotated at the time of teaching, the orthogonal state is broken. For this reason, the operator rotates the rotational axis according to the movement of the attitude axis so as to obtain the orthogonal state. However, with this, since the orthogonal state should be made for each of the teaching points, as a number of the teaching points increases, the teaching takes longer time. Furthermore, if the attitude direction is to be corrected, then there arises a problem that the rotating angles of the rotational axis and the attitude axis should be corrected.

It is an object of the present invention to provide a control apparatus for a three-dimensional laser working machine which is capable of making teaching which maintains an orthogonal state of a laser nozzle with respect to a working surface efficiently and fast in a three-dimensional laser working machine having a head structure that working points do not change when a rotational axis and an attitude axis are rotated.

DISCLOSURE OF THE INVENTION

The control apparatus according to the present invention controls a three-dimensional laser working machine. The three-dimensional laser working machine includes a head structure that working points do not change when a rotational axis and an attitude axis are rotated. The control apparatus decides a tip position and an attitude of a nozzle of the head structure and carries out working based on the decided tip position. This control apparatus comprises a unit which calculates a nozzle direction vector from current angles of the rotational axis and the attitude axis, a unit which calculates an angle where the attitude axis changes for constant time and calculating an angle through which the rotational axis is rotated so that X and Y directions of the nozzle direction vector are kept constant according to an angle change amount of the attitude axis, and a unit which controls the rotation of the rotational axis by the calculated angle. Therefore, the rotational axis can be rotated by the angle which is calculated so that the X and Y directions of the nozzle direction vector are kept constant according to a constant time angle change amount of the attitude axis, and the X and Y directions of the nozzle direction vector can be kept constant.

In the above-mentioned control apparatus, when teaching new teaching point accompanying the rotation of the attitude axis from a teaching point of an orthogonal state, the rotation of the rotational axis is controlled according to the change amount of the attitude axis so that the orthogonal state with respect to a workpiece is obtained. Therefore, the rotational axis can be rotated by the angle which is calculated so that the X and Y directions of the nozzle direction vector are kept constant according to a constant time angle change amount of the attitude axis, and the X and Y directions of the nozzle direction vector can be kept constantly in a direction which is orthogonal to the workpiece.

In the above-mentioned control apparatus, when the attitude axis is rotated in order to correct an attitude direction with respect to the teaching point once created, the rotation of the rotational axis is controlled so that the orthogonal state is obtained with respect to the workpiece according to the change amount of the attitude axis. Therefore, also when the attitude axis is rotated from the orthogonal state at the time of correcting the teaching, the rotational axis can be rotated so as to be kept orthogonal to a working workpiece according to the constant time angle change amount of the attitude axis.

In the above-mentioned control apparatus, constant movement of the nozzle direction vector can be switched between valid and invalid, and when movement instructions such as jog and fast-forward of the attitude axis are given, the rotation of the rotational axis is controlled by the calculated angle so that X and Y directions of the nozzle direction vector are kept constant according to the change amount of the attitude axis. Therefore, constant movement of the nozzle direction vector can be switched between valid and invalid, and the switching between valid and invalid is always possible during the teaching operation, the operation of the control apparatus and the like. Further, when movement instructions such as jog and fast-forward are given to the attitude axis, since the rotational axis is rotated by the angle which is calculated so that the X and Y directions of the nozzle direction vector are kept constant according to the constant time angle change amount of the attitude axis, the operation for obtaining the orthogonal state can be omitted.

BRIEF DESCRIPTION OF THE DRAWINGS

FIG. 8 is a flowchart showing a teaching operation by means of a conventional control apparatus for a three-dimensional laser working machine.

BEST MODE FOR CARRYING OUT THE INVENTION

Embodiments of the control apparatus for a three-dimensional laser working machine according to the present invention will be explained in detail below with reference to the accompanying drawings.

Figure 1:
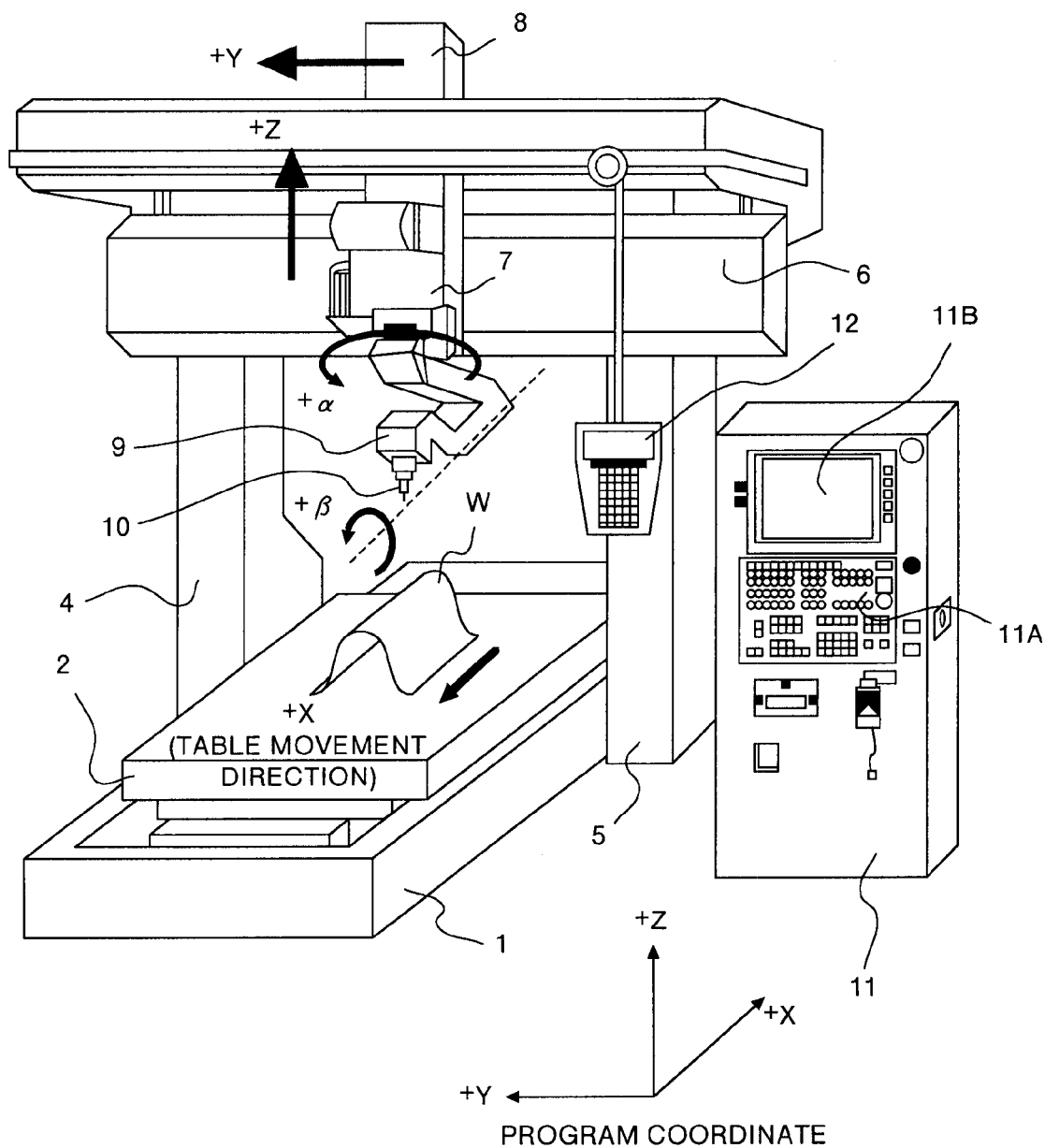
FIG. 1 is a perspective view showing a structural example of a three-dimensional laser working machine to which a control apparatus of the present invention is applied.

FIG. 1 shows a structural example of a three-dimensional laser working machine to which a control apparatus of the present invention is applied. This three-dimensional laser working machine has a work table 2 which is provided on a head 1 so as to be capable of moving in an X axial direction, a cross rail 6 which is horizontally laid across right and left columns 4 and 5, a Y axial unit 7 which is provided on the cross rail 6 so as to be capable of moving in a Y axial direction, a Z axial unit 8 which is provided to the Y axial unit 7 so as to be capable of moving in a Z axial direction, a working head 9 which is attached to the Z axial unit 8, a laser nozzle (working nozzle) 10 which is provided to a tip portion of the working head 9, a computer-type numerical value control unit 11, and a pendant type teaching box 12. The numerical value control unit 11 has an operation board 11A and an image display section 11B such as CRT as man-machine interface.

The work table 2, the Y axial unit 7 and the Z axial unit 8 are driven by an X axial servomotor, a Y axial servomotor and a Z axial servomotor, not shown, respectively, and their positions are controlled by axial instructions of the numerical value control unit 11.

Figure 2:
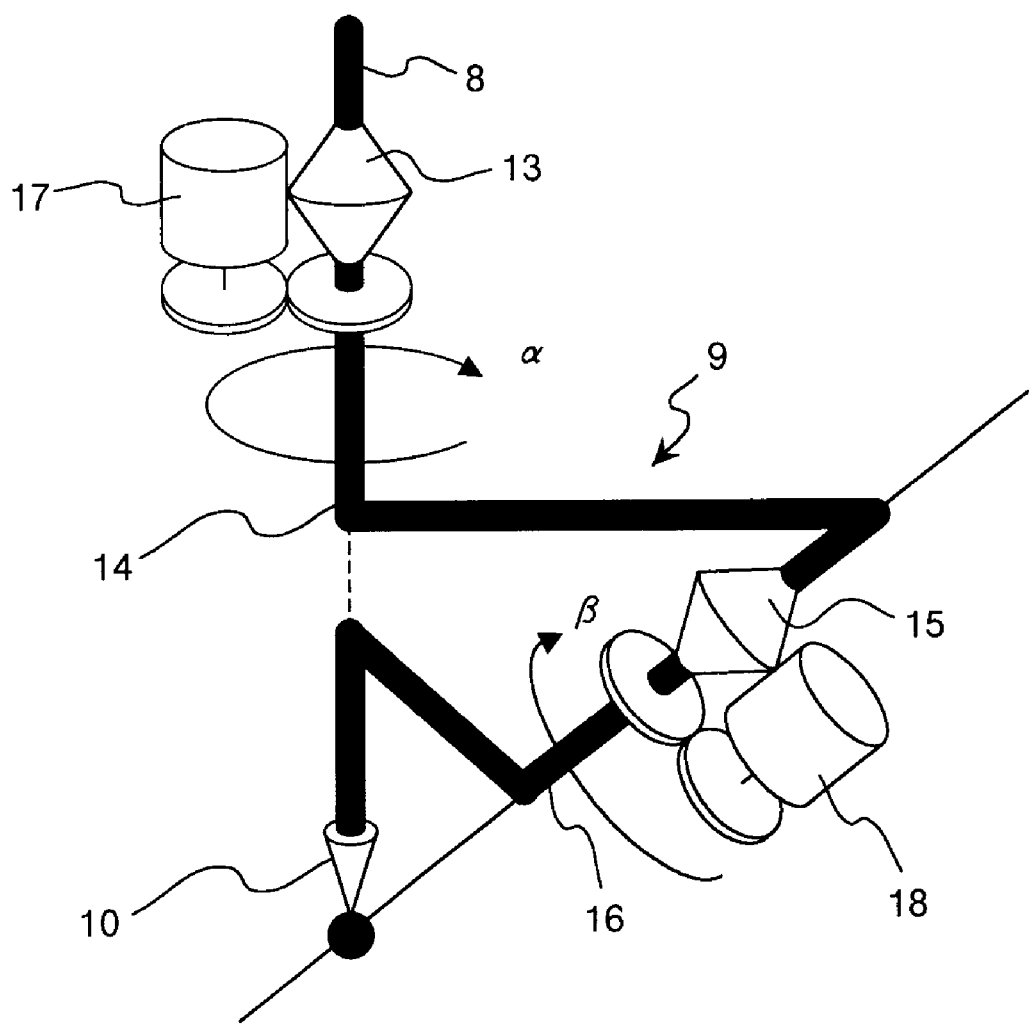
FIG. 2 is a schematic diagram showing a structure of a working head of the three-dimensional laser working machine to which the control apparatus of the present invention is applied.

The working head 9 is constituted similarly to the conventional one, and as shown in FIG. 2, it has a rotational axis 14 which is provided to a tip of the Z axis unit 8 by a bearing member 13 so as to be rotatable around a center axis of the Z axis, and an attitude axis 16 which is attached to a tip of the rotational axis 14 by a bearing member 15 so as to be rotatable around an axis slanted with respect to the Z axis. The laser nozzle 10 is attached to a tip of the attitude axis 16. The rotational axis 14 is driven to be rotated by an a axial servomotor 17, and the attitude axis 16 is driven to be rotated by a β axial servomotor 18.

The X axial servomotor, the Y axial servomotor and the Z axial servomotor (not shown), the a axial servomotor 17 and the β axial servomotor 18 are driven by a driving signal from the numerical value control unit 11, and are controlled so that while a separate distance of the laser nozzle 10 from a workpiece on the work table 2 is being kept constant according to teaching data, a spot of a laser beam follows a periphery of a working line and a direction attitude of the laser nozzle 10 is vertical (normal) to the surface of a workpiece W.

Figure 3:
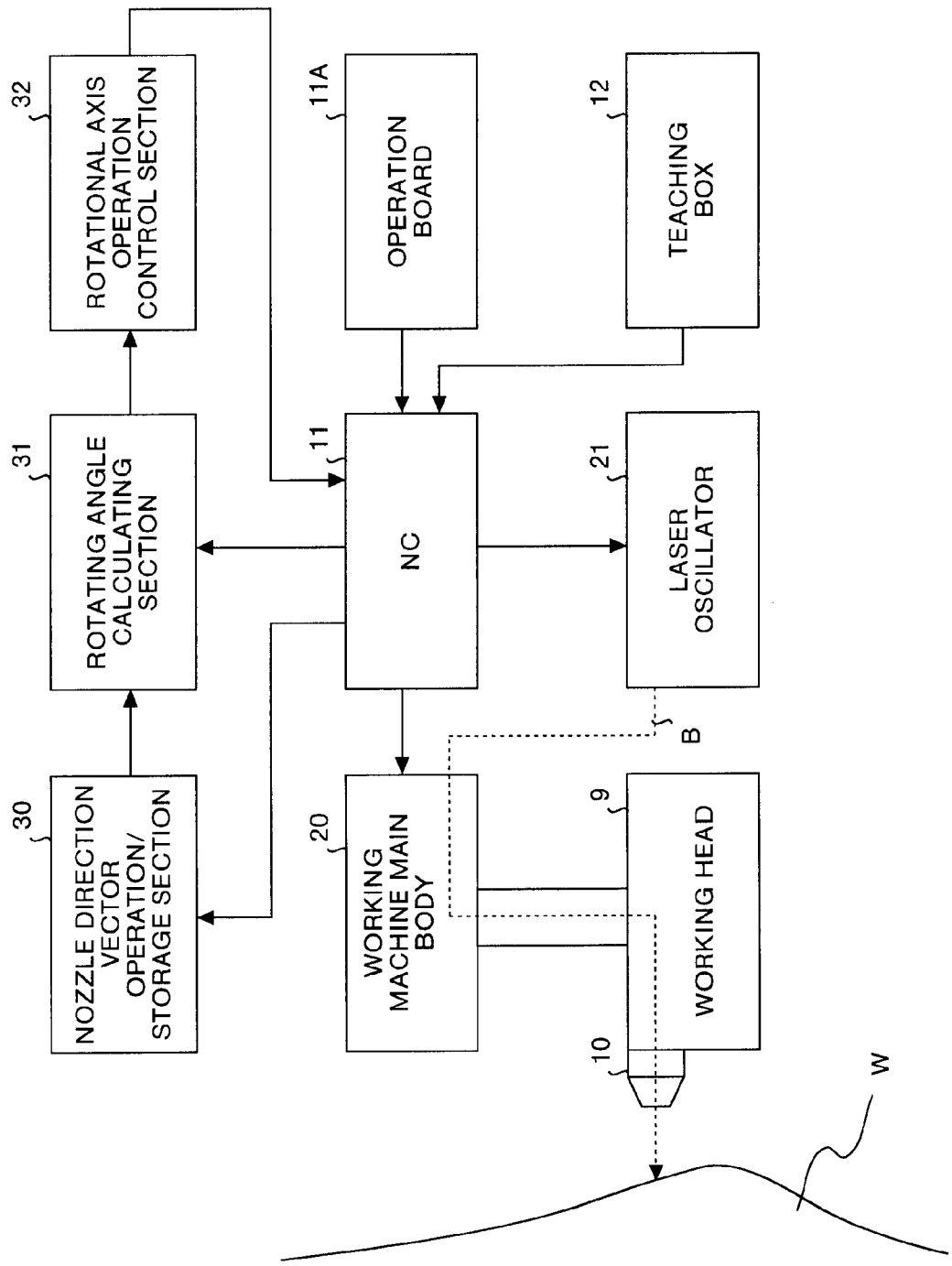
FIG. 3 is a block diagram showing the control apparatus for a three-dimensional laser working machine according to one embodiment of the present invention.

FIG. 3 shows an optical system of the above-mentioned three-dimensional laser working machine and a control system including the control apparatus for a three-dimensional laser working machine of the present invention. In FIG. 3, parts such as the work table 2, the Y axial unit 7 and the Z axial unit 8 are totally called as a working machine main body 20. The three-dimensional laser working machine has a laser oscillator 21 as the optical system, and a laser beam B output from the laser oscillator 21 reaches the laser nozzle 10 via the working head 9 and is emitted to a surface of the workpiece W to be worked by the laser nozzle 10.

The control apparatus for a three-dimensional laser working machine has a nozzle direction vector operation/storage section 30, a rotating angle calculating section 31 and a rotational axis operation control section 32.

The nozzle direction vector operation/storage section 30 is operated when validity of nozzle direction vector constant movement is turned on by the teaching box 12 or by handle and joy stick provided to the operation board 11A, and calculates a nozzle direction vector from the current rotating angles of the rotational axis 14 and the attitude axis 16 and stores it.

The rotating angle calculating section 31 obtains an angle through which the attitude axis 16 was rotated for constant time by instructions from the teaching box 12, the handle and joy stick provided to the operation board 11A and the numerical value control unit 11, and calculates an angle through which the rotational axis 14 is to be rotated so that X and Y directions of the nozzle direction vector calculated by the nozzle direction vector operation/storage section 30 are kept constant according to a change amount of the attitude axis 16.

The rotational axis operation control section 32 controls the rotation of the rotational axis 14 based on the rotating angle of the rotational axis 14 calculated by the rotating angle calculating section 31.

Figure 4:
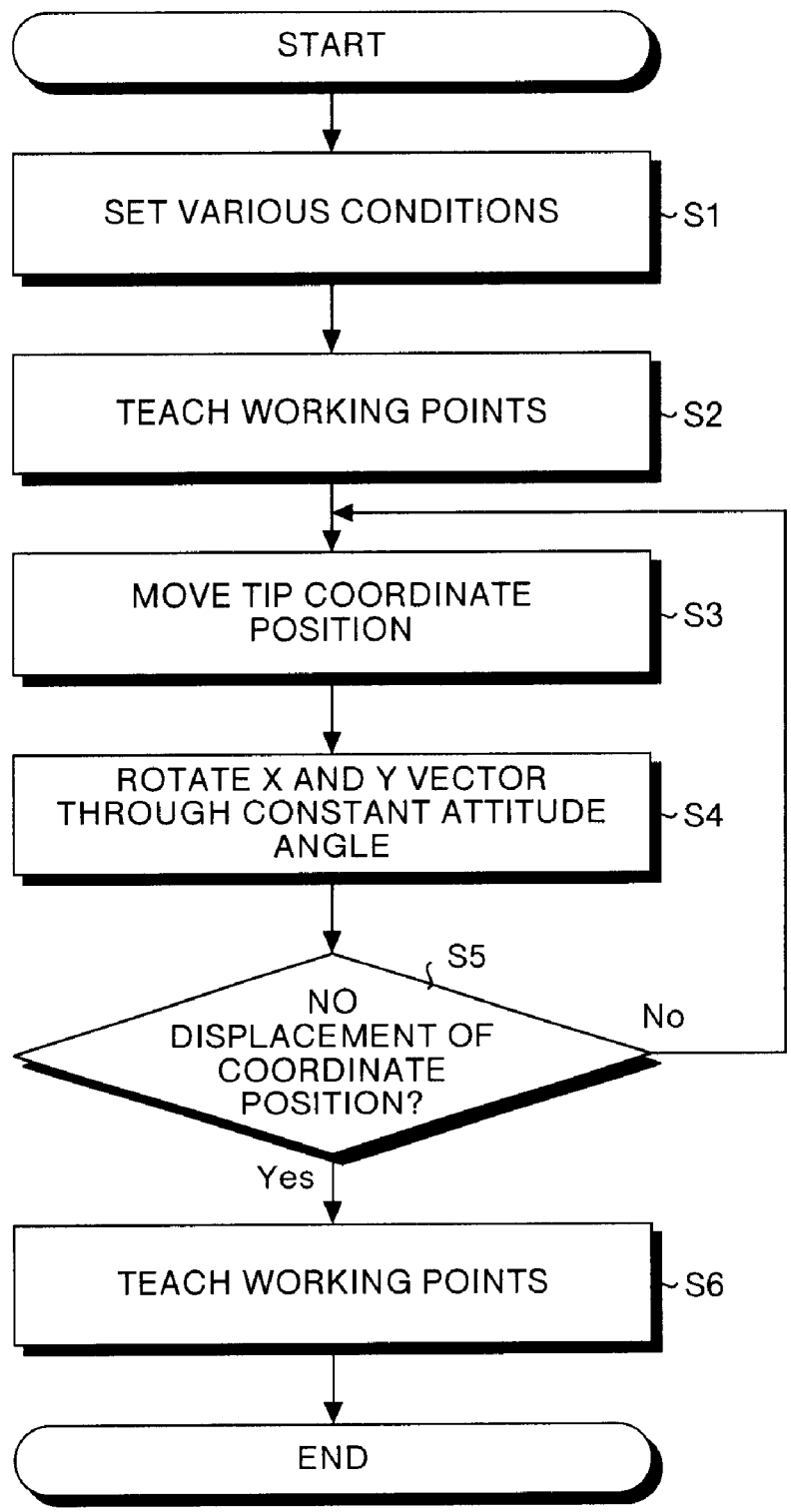
FIG. 4 is a flowchart showing a teaching process by means of the control apparatus for a three-dimensional laser working machine of the present invention.

Next, there will be explained below the teaching of the attitude change corner section by means of the control apparatus for a three-dimensional laser working machine having the above structure with reference to FIG. 4.

Firstly, various settings of the teaching box are carried out, and the teaching operation for teaching working points is brought into a startable state by using a working machine (step S1).

Next, an instruction such as shutter opening of an auxiliary function code as the initial setting in the working program is given, and a working axis is moved to a teaching point by pushing down a working axis feed key provided to the teaching box or using the handle or the joy stick and teaching is made so that respective teaching points in the working program are created (step S2).

Figure 7:
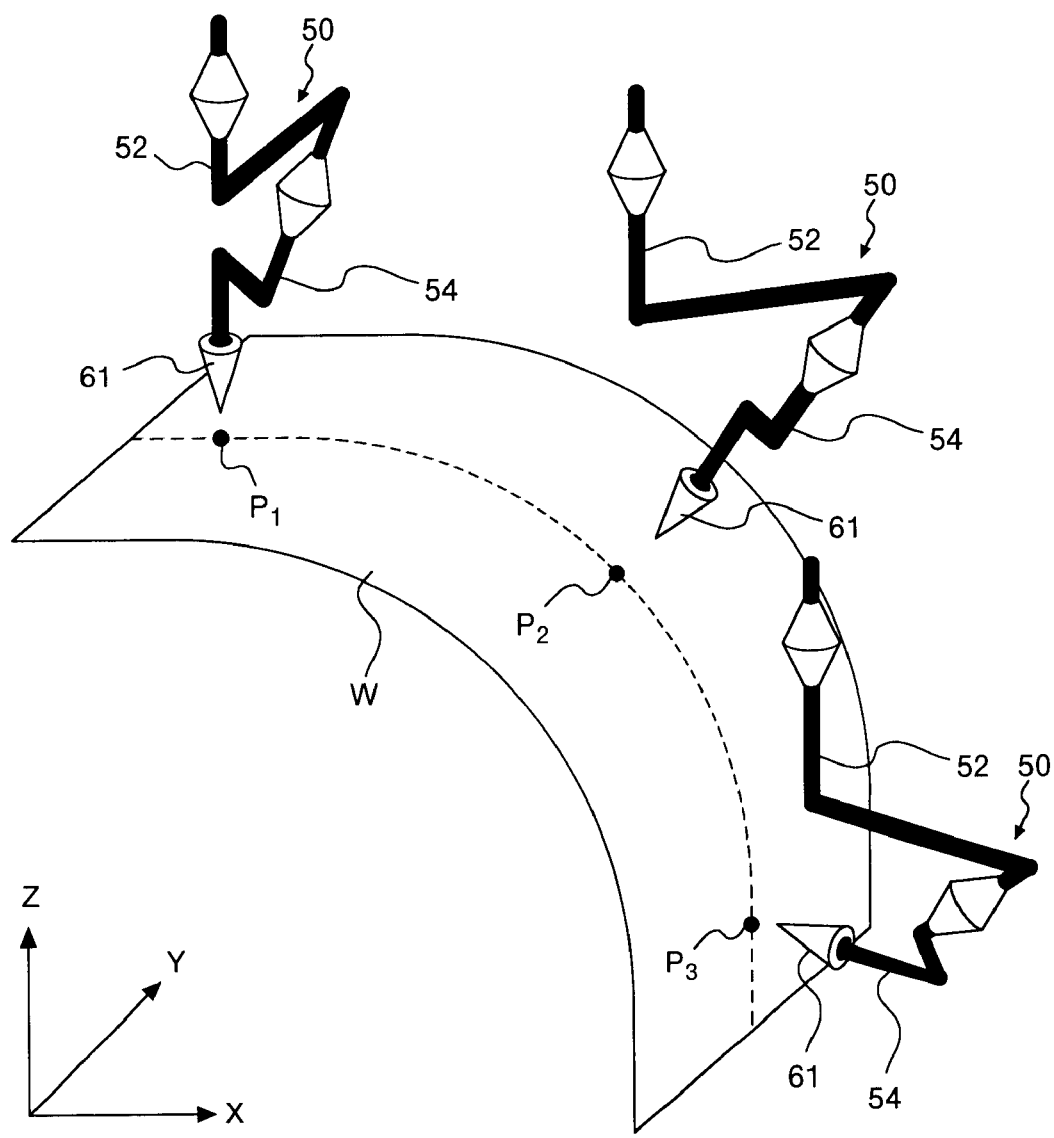
FIG. 7 is a perspective view showing an outline of an attitude change of the working head at an attitude change corner section.

When the teaching points are created, in the conventional teaching operation of the attitude change corner section, for example in the case of the teaching from the teaching point $P_1$ on the horizontal surface to the teaching point $P_2$ on the 45 degrees slanted surface shown in FIG. 7, the working head 9 is moved so that the tip coordinate meets the teaching point $P_2$ on the 45 degrees slanted surface (step S3).

Since the nozzle direction vector constant movement is switching into valid and the attitude axis 16 as well as the rotational axis 14 is moved so that the X and Y directions of the nozzle direction vector are kept constant according to a constant time angle change amount of the attitude axis 16, the attitude axis 16 is moved until the orthogonal state is obtained (step S4).

Thereafter, the tip coordinate is checked for displacement (step S5). When displacement occurs, the sequence returns to step S3 so that the tip coordinate is moved. After the tip coordinate is moved, the process at step S4 is executed so that the orthogonal state is again obtained. Namely, the steps S3 through S5 are repeated.

Similarly, at the time of the teaching from the teaching point $P_2$ on the 45 degrees slanted surface to the teaching point on the upright surface shown in FIG. 7, steps S3 through S5 are repeated.

When the program creation by the teaching of the attitude change corner section is completed, the working point is moved to a teaching point by pushing down the working axis feed key provided to the teaching box 12 or using the handle or the joy stick and the teaching is made so that the respective teaching points in the working program are created (step S6). However, when there is the teaching of the attitude change corner section, steps S3 through S5 are executed. Finally, instructions such as shutter closing and program end of the auxiliary function code are given so that the creation of the working program is ended.

Figure 5:
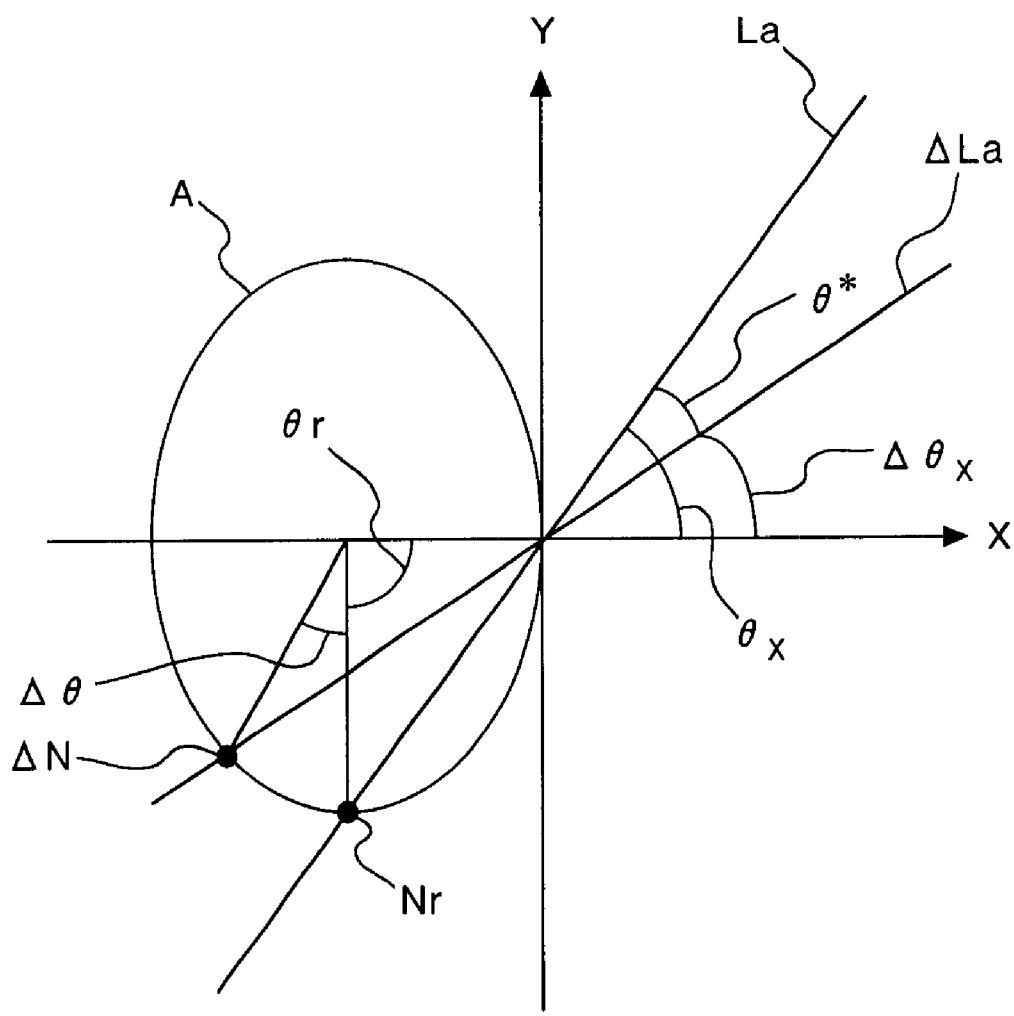
FIG. 5 is a graph showing a locus of a nozzle direction vector on X and Y planes and an angle change of a rotational axis and an attitude axis of the working head.
Figure 6:
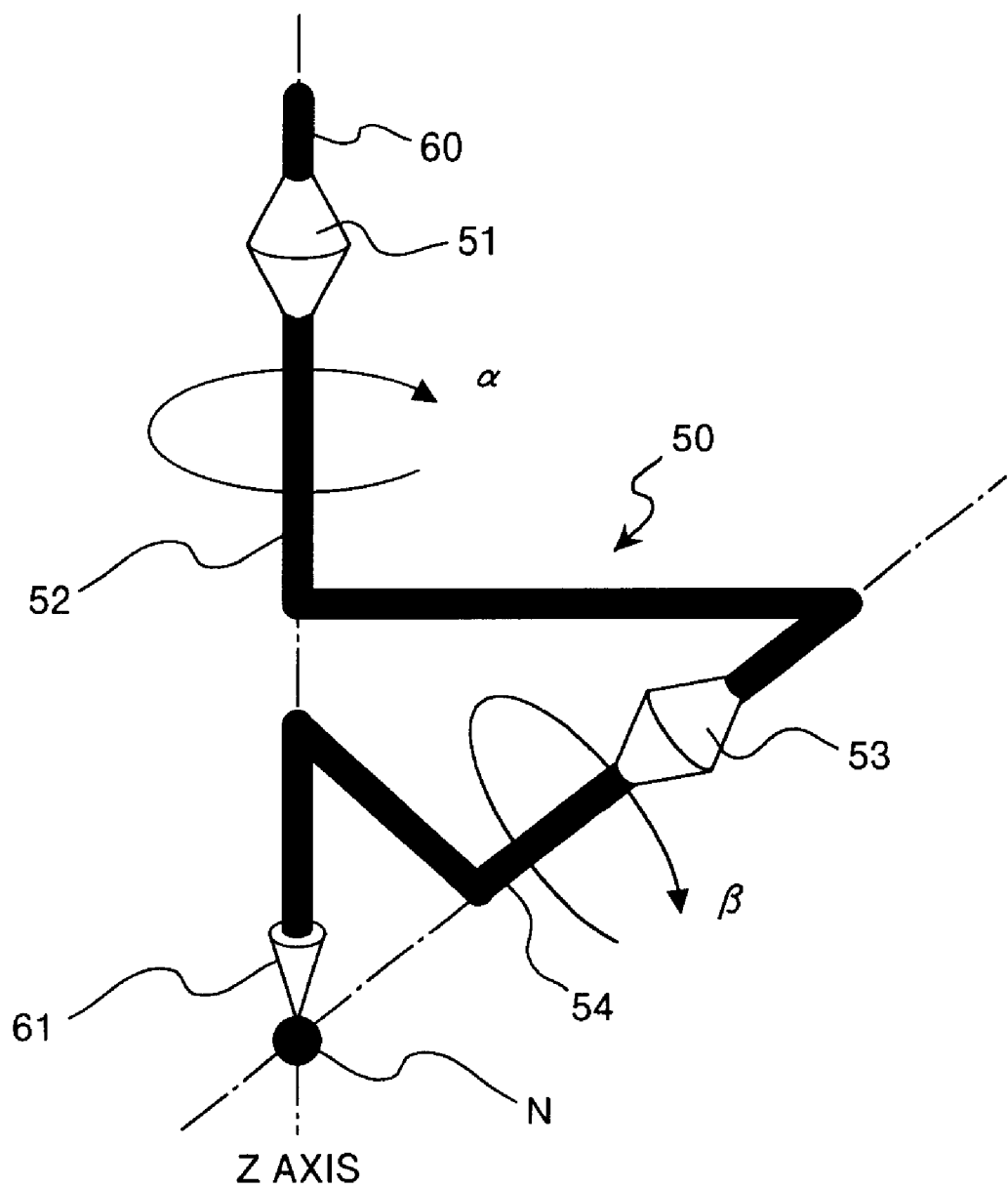
FIG. 6 is a schematic diagram showing a structure of the working head to be used in the three-dimensional laser working machine.

In the operation process in the rotating angle calculating section 31, calculation is made by the following logical expression. FIG. 5 shows a locus of the nozzle direction vector with respect to a change of the attitude axis 16 on X and Y planes. In FIG. 5, A is a locus of the nozzle direction vector with respect to a change of the attitude axis 16, θr is a current attitude axis angle, Nr is a point on the locus A at the attitude axis angle θr, La is a straight line made by the point Nr on the locus A and an original point, θx is an angle made by the straight line La and the X axis, Δθ is a constant time angle change amount of the attitude axis 16, Δθ is a point on the locus A in the angle change amount Δθ, ΔLas a straight line made by the point ΔN and the original point, Δθx is an angle made by the straight line ΔLa and the X axis, and θ* is an angle change amount of the rotational axis 14 for keeping the nozzle direction constant according to the constant time angle change amount of the attitude axis 16.

When the angle of the rotational axis 14 of the working head 9 is α and the angle of the attitude axis 16 is β, a nozzle direction unit direction vector d becomes:

$$d = \begin{bmatrix} -1/2 \cdot \cos\alpha + 1/2 \cdot \cos\alpha \cdot \cos\beta - \sqrt{2}/2 \cdot \sin\alpha \cdot \sin\beta \\ 1/2 \cdot \sin\alpha - 1/2 \cdot \sin\alpha \cdot \cos\beta - \sqrt{2}/2 \cdot \cos\alpha \cdot \sin\beta \\ -1/2 - 1/2 \cdot \cos\beta \end{bmatrix}$$

At this time, if the attitude axis 16 is 0 degrees, X and Y are simplified as follows, $X = 1/2 \cdot \cos\beta - 1/2$ $Y = -\sqrt{2}/2 \cdot \sin\beta$ When the above equations are drawn on the X and Y planes, the locus A is obtained. When the angle formed by the straight line La and the X line at the point Nr is θx, a tilt of the straight line La is represented by the following equation, $\tan \theta x = Y/X$ $= -\sqrt{2} \cdot \sin \beta / (\cos \beta - 1)$ Therefore, the angle θx made by the straight line La and the X axis at the point Nr becomes, $\theta x = \tan^{-1}\{-\sqrt{2} \cdot \sin \beta / (\cos \beta - 1)\}$ When the angle made by the straight line ΔLa and the X line with respect to the angle change amount Δθ is Δθx, it becomes, $\Delta\theta x = \tan^{-1}\{-\sqrt{2} \cdot \sin(\beta + \Delta\beta)/(\cos (\beta + \Delta\beta) - 1)\}$ At this time, in order to keep the X and Y directions of the nozzle direction vector constant, the straight line La before the angle of the attitude axis 16 changes may match with the straight line ΔLa after the angle changes. For this reason, a displaced angle may be rotated through the rotational axis 14, and thus a correcting angle θ* of the rotational axis can be deduced according to the following calculation equation.

$\theta^* = \theta x - \Delta\theta x$

When this is represented sequentially, this becomes, $\theta xn = \tan^{-1}(-\sqrt{2} \cdot \sin(\beta n - 1 + \Delta\beta)/\cos(\beta n - 1 + \Delta\beta) - 1))$ and a correcting angle 22 of the rotational axis by means of the sequential expression is deduced from the following calculation equation, $\theta^* n = \theta xn - \theta xn - 1$ As mentioned above, the nozzle-direction vector is calculated from the current angle of the rotational axis 14 and current angle of the attitude axis 16, and the rotational axis 14 is rotated through an angle which is calculated so that the X and Y directions of the nozzle direction vector are kept constant according to the constant time angle change amount of the attitude axis 16. For this reason, the operation for obtaining the orthogonal state becomes easy, and the operability due to shortening of time can be improved.

In addition, when the attitude axis is rotated from the orthogonal state at the time of correcting the teaching, the rotational axis is rotated so as to be kept in the orthogonal state with respect to a working workpiece according to the constant time angle change amount of the attitude axis. For this reason, the operation for obtaining the orthogonal state can be omitted, and the operability due to the shortening of time can be improved.

In addition, since the constant movement of the nozzle direction vector can be switched between valid and invalid, the switching between valid and invalid is always possible for example during the teaching operation or operation of the control apparatus. Further, when moving instructions such as jog or fast-forward are given to the attitude axis, the rotational axis is rotated through an angle which is calculated so that the X and Y directions of the nozzle direction vector are kept constant according to the constant time angle change amount of the attitude axis. For this reason, the operation for obtaining the orthogonal state can be omitted, and the operability due to shortening of time can be improved.

INDUSTRIAL APPLICABILITY

The present invention can be used in a three-dimensional laser working machine which teaches a tip position and an attitude of a nozzle and carries out working based on the teaching such as a three-dimensional laser working machine for creating a die and the like.

What is claimed is:

1. A control apparatus for a three-dimensional laser working machine, said three-dimensional laser working machine including a head structure for which working points do not change when a rotational axis and an attitude axis are rotated, said control apparatus deciding a tip position and an attitude of a nozzle of said head structure and carrying out working based on the decided tip position, said control apparatus comprising:

a unit which calculates a nozzle direction vector from current angles of the rotational axis and the attitude axis, a unit which calculates an angle where the attitude axis changes for constant time and calculating an angle through which the rotational axis is rotated so that X and Y directions of the nozzle direction vector are kept constant according to an angle change amount of the attitude axis, and a unit which controls the rotation of the rotational axis based on the calculated angle.

2. The control apparatus for a three-dimensional laser working machine according to claim 1, wherein, when teaching of new teaching point accompanying the rotation of the attitude axis from a teaching point of an orthogonal state, the rotation of the rotational axis is controlled so that the orthogonal state with respect to a workpiece is obtained according to the change amount of the attitude axis.

3. The control apparatus for a three-dimensional laser working machine according to claim 2, wherein, when the attitude axis is rotated in order to correct an attitude direction with respect to the teaching point once created, the rotation of the rotational axis is controlled so that the orthogonal state is obtained with respect to the workpiece according to the change amount of the attitude axis.

4. The control apparatus for a three-dimensional laser working machine according to claim 1, wherein, constant movement of the nozzle direction vector can be switched between valid and invalid, and when movement instructions such as jog and fast-forward of the attitude axis are given, the rotation of the rotational axis is controlled by the calculated angle so that X and Y directions of the nozzle direction vector are kept constant according to the change amount of the attitude axis.

5. A control apparatus for controlling a three-dimensional laser working machine that includes a head structure having a nozzle, and capable of preventing working points from shifting when a rotational axis and an attitude axis are rotated, the control apparatus determining a tip position and an attitude of the nozzle by a teaching operation and carrying out work based on the determined tip position, the control apparatus comprising:

a unit that calculates a nozzle direction vector from current angles of the rotational axis and the attitude axis at a teaching point;

a unit that calculates a variation of an angle in the attitude axis between its value at teaching points and an amount of an angle for the rotational axis to be rotated at the teaching point so that X and Y directions of the nozzle direction vector are kept constant according to the variation of the angle in the attitude axis; and a unit that controls the rotation of the rotational axis based on the amount of the angle calculated, wherein
when the teaching point is moved to a new teaching point accompanying a rotation of the attitude axis from the previous teaching point, the rotation of the rotational axis is controlled so that a positionally orthogonal relationship between the nozzle and a workpiece is maintained according to the amount of the angle calculated.

6. The control apparatus for a three-dimensional laser working machine according to claim 5, wherein when the attitude axis is rotated in order to correct an attitude direction with respect to the previous teaching point, the rotation axis is controlled so that the positionally orthogonal relationship between the nozzle and the workpiece is maintained according to the change amount of the angle calculated.

7. A three-dimensional laser working machine, comprising;

an oscillator that oscillates a laser beam;

a working head that transmits the laser beam to a workpiece and has a rotational axis and an attitude axis; and the control apparatus according to claim 1 that controls the oscillator and the working head.

* * * * *